INVENTOR.
D. LEYBURN
BY Rogers Bereskin & Parr

INVENTOR.
D. LEYBURN
BY Rogers Bereskin & Parr

INVENTOR.
D. LEYBURN
BY Rogers Bereskin & Parr

INVENTOR.
D. LEYBURN
BY Rogers Bereskin & Parr

| +24V n.g.b. RECEIVED ON LEAD | MEMORY RELAYS OPERATED | OUTPUT SELECTED |
|---|---|---|
| s | MR1 | 66 (T1', R1', S1') |
| r | MR2 | 64 (T2', R2', S2') |
| r AND s | MR1 & MR2 | 62 (T3', R3', S3') |

INVENTOR.
D. LEYBURN
BY Rogers Bereskin & Parr

INVENTOR.
D. LEYBURN
BY Rogers Bereskin & Parr

United States Patent Office 3,495,043

Patented Feb. 10, 1970

3,495,043 DIGIT ABSORBING SELECTOR MEMORY CIRCUIT AND TRUNK SPLITTING CIRCUIT

Dereck Leyburn, 1270 Quennville Drive, Apt. 110, St. Laurent, Quebec, Canada

Filed June 3, 1966, Ser. No. 555,081
Int. Cl. H04m 3/00
U.S. Cl. 179—18 20 Claims

ABSTRACT OF THE DISCLOSURE

A telephone selector switch having a memory relay which operates when the switch absorbs a selected digit. Then when the selector in response to the next digit dialed into it, seizes an idle trunk, the memory relay applies a brief pulse of a memory signalling potential over one of the trunk leads (e.g. its ring lead) to signal a trunk splitting circuit at the other end of the trunk that a digit has been absorbed. The trunk splitting circuit has a routing relay operated by the memory signal, a first output to which the trunk is routed in the absence of a memory signal, and a second output to which the trunk is routed by the routing relay if a memory signal is received. Thus, the same digit dialed into the selector will cause its connection to either of two outputs, depending on whether the previous digit has been absorbed.

This invention relates to digit absorption in a step by step telephone system. More particularly, it relates to a memory circuit for a digit absorbing selector switch, such that when a non-absorbed digit is dialed into the selector switch, an indication will be provided as to whether a selected digit has previously been absorbed.

This and other features of the invention will best be appreciated after a preliminary discussion of the accompanying drawings, in which.

Figure 1:
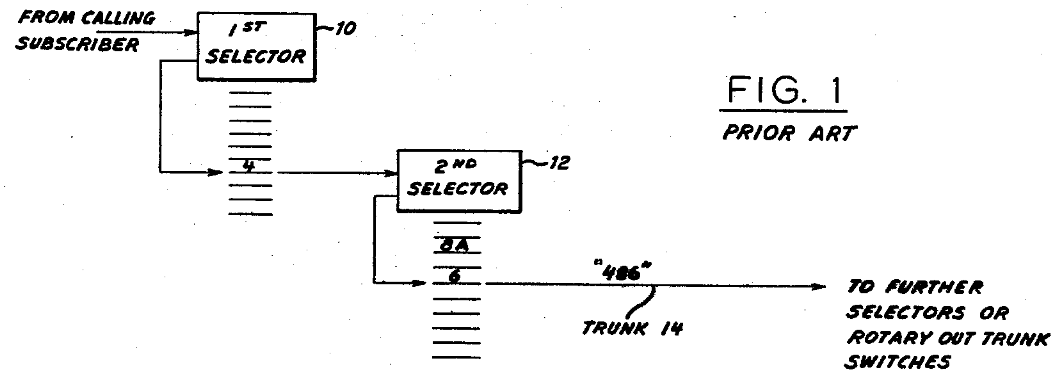
FIG. 1 is a diagrammatic view of first and seocnd selector switches for explanation of digit absorption.

It should be noted that in the drawings, detached contact notation is used throughout. Thus, the notation A on the drawings indicates the coil of relay A, while A–1 indicates the first contact of relay A. If the contact A–1 is marked with a cross, then this contact is normally open, i.e. it is open when relay A is released, while if the contact is marked with a bar, it is colsed when relay A is released.

INTRODUCTION

Selector switches in a step by step telephone office are often provided with digit absorbing capability. A typical situation in which digit absorption is provided is when office codes which may be dialed by subscriptions connected to the office in question are, for example 489; 488 . . . 481.

When a subscirber in such an office picks up his telephone, he is connected via a linefinder to a first selector, shown diagrammatically at 10 in FIG. 1. If he then dials as his first digit a "4," he is connetced by the first selector to a second selector 12. Upon dialing of the second digit, an "8," the wiper assembly (not shown) of the second selector 12 steps up to the eighth level, where a "normal post spring" (NPS) assembly (not shown) is pre-set to drop the wiper assembly back down to its initial position without having hunted on the eighth level for an idle trunk. In other words, this second digit has been absorbed by the second selector. This is diagrammatically indicated by the notation "8A" on the eighth level of the second selector.

The subscriber next dials a third digit, for example a "6," and the second selector wiper assembly steps up to the sixth level, rotates to find an idle trunk 14 (having the usual tip, ring and sleeve leads) on that level, and connects the subscriber through the trunk 14 either to a next selector or to a rotary out-trunk switch (not shown). The result is that, by use of digit absorbing, which is well known, one bank of selector switches can be eliminated.

However, difficulties arise when an office of the type just described has to be modified so that a subscriber connected to the office can also dial a further code, such as "465," which code is to connect him to equipment different from that to which he would be connected if he dialed the code "486." Assume that the subscriber dials the first digit, "4" of this new code. The wipers of the first selector 10 steps up to the fourth level and connect the subscriber to the second selector 12. If he then dials the second digit, "6" of the new code, the second selector wipers steps up to the sixth level and connects him to the same place as that to which he would have been connected had he dialed "486." This is obviously undesirable, since dialing "46" is supposed to connect the subscriber eventually to a different place than dialing "486." For this reason, in the past, digit absorption had to be eliminated and a further bank of selector switches installed, when subscribers to an office which included digit absorption features were permitted to dial new codes which offered this possibility of conflict.

This invention provides an arrangement which eliminates the need for adding a further bank of selectors in a situation of the type mentioned above, where, for example, an office has second selectors which absorb a digit such as the "8" in a series of codes 489; 488; 487; 486; 485; etc. and the subscribers to that office are then permitted to dial codes, the first digit of which is a "4" and the second digit of which is a digit other than "8."

Figures 2, 6:
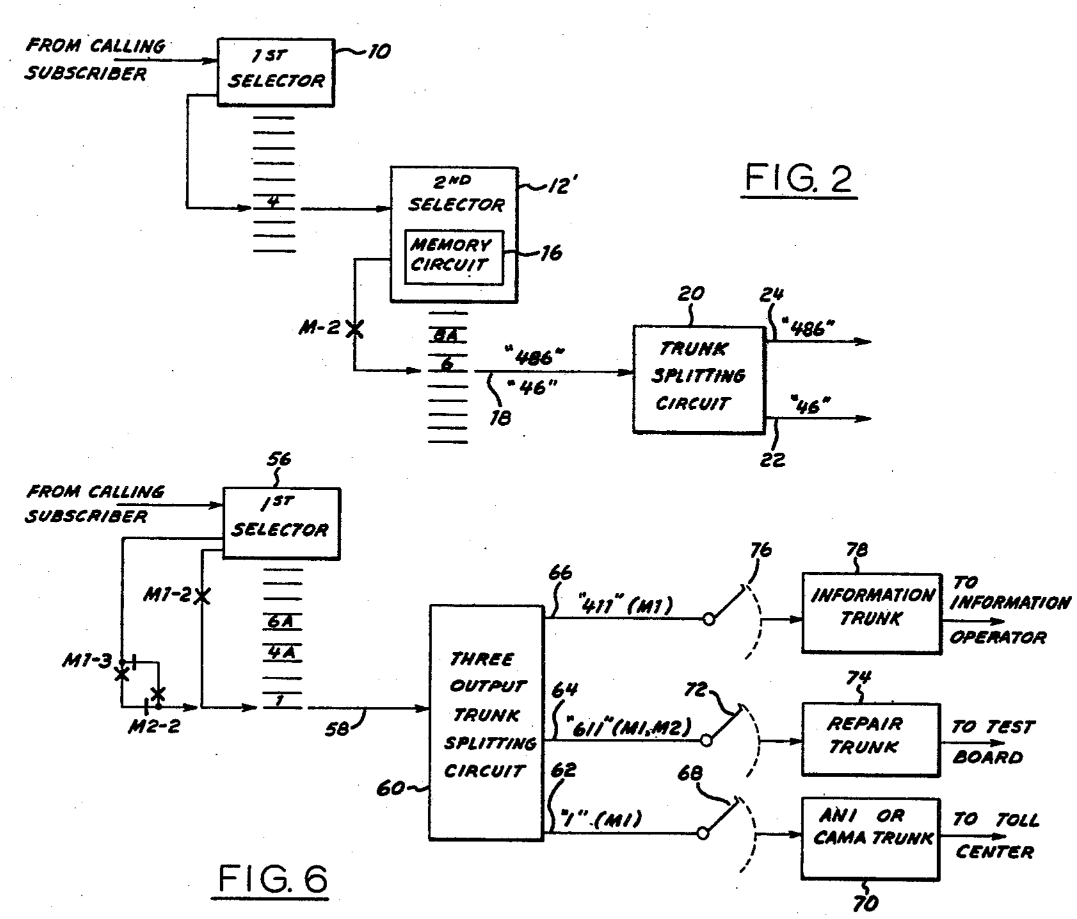
FIG. 2 is a block diagram showing a memory equipped selector switch coupled to a trunk splitting circuit.
FIG. 6 shows a typical application for the FIG. 5 circuit as used with a three way trunk splitting circuit.

An exemplary form of the invention is shown in block diagram form in FIG. 2, where a second selector 12' is shown modified to incorporate a memory circuit 16. The second selector 12' is set to absorb the digit "8," and when this digit is absorbed, a memory relay (not shown) in the memory circuit 16 operates to register this event. When the next digit, a "6," is dialed, the second selector wipers step up to the sixth level and then around to seize an idle outgoing trunk 18. Upon seizure of the trunk 18, a special signalling potential is applied thereto through a normally open contact M–2 of the memory relay, which contact has closed upon operation of the memory relay.

The signalling potential is sent forward over the trunk 18 to a trunk splitting circuit 20, which routes the trunk 18 to a first output 24 when the signalling potential is present (indicating that digit "8" was absorbed prior to the dialing of digit "6"), and which routes trunk 18 to a second output 22 when no signalling potential is present (indicating that no digit has been absorbed prior to dialing of digit "6"). Thus, when "486" is dialed, the trunk 18 is routed to output 24 of the trunk splitting circuit, and when "46" is dialed, so that no digit is absorbed, trunk 18 is routed to output 22 of the trunk splitting circuit.

In the result, the need for a further bank of selectors is eliminated, such further bank being replaced by memory circuits in the second selectors in combination with trunk splitting circuits.

DESCRIPTION OF DIGIT ABSORBING SELECTOR SWITCH

Figure 3:
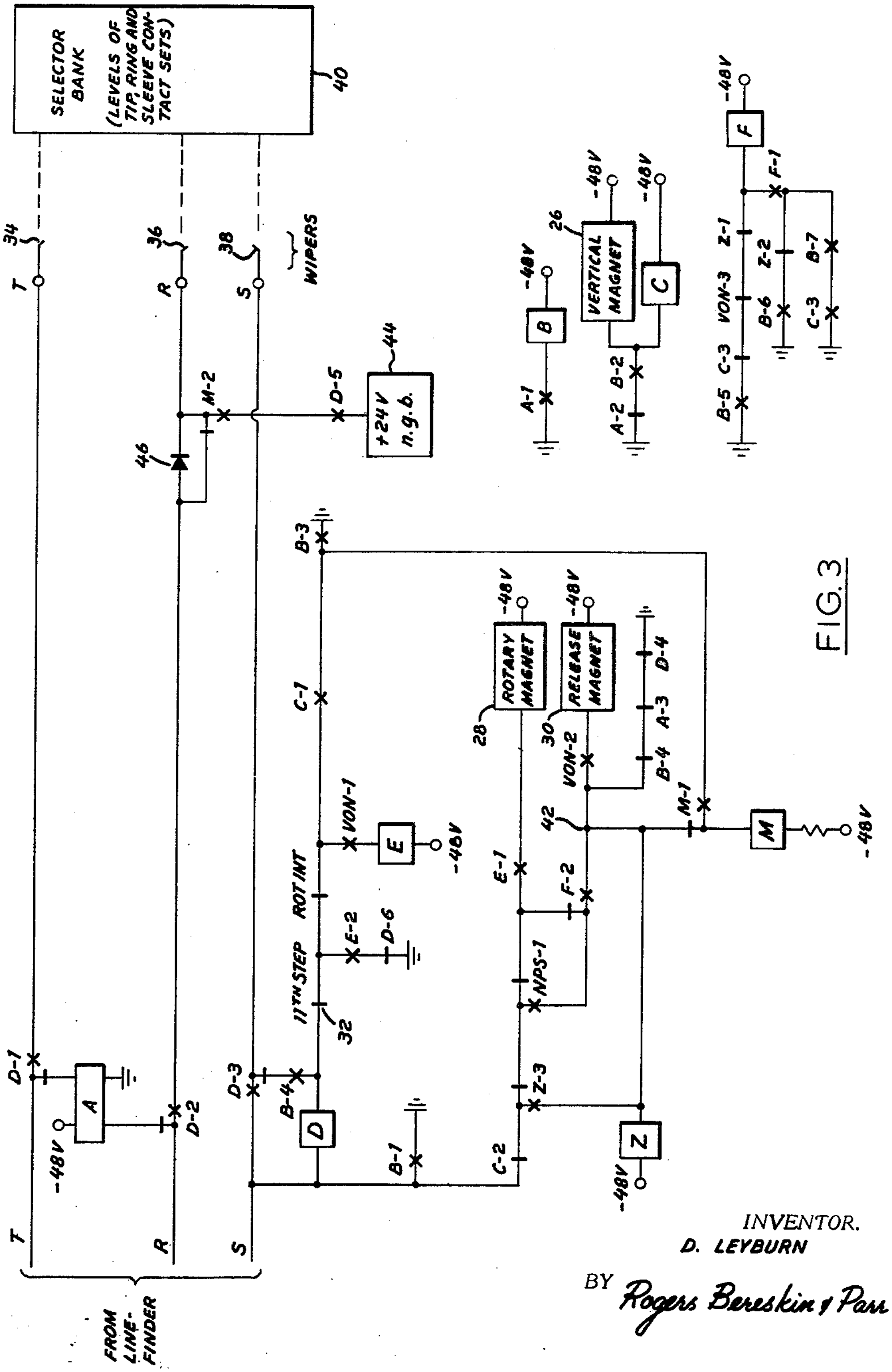
FIG. 3 shows a portion of a selector circuit modified to include a memory circuit according to the invention.

Reference is next made to FIG. 3, which shows a portion of an existing digit absorbing selector switch circuit with the memory feature added. Since the digit absorbing selector circuit itself is completely standard, a detailed discussion of the same is believed unnecessary, but by way of introduction, brief reference will be made to the structure and operation of a selector switch.

A conventional selector switch contains a pulsing relay A, a slow release holding relay B, a slow release interdigital timing relay C, a seizure or cut-through relay D, a rotary control relay E, an absorb-repeatedly relay F, a once-only absorption relay Z, a vertical magnet 26, a rotary magnet 28, a release magnet 30, 11th step spring contacts 32, rotary interrupter contacts ROT INT, vertical off normal contacts VON, and a normal post spring assembly including normal post spring contacts NPS. Also provided are tip, ring and sleeve wipers 34, 36 and 38 which cooperate with a number of levels of outgoing tip, ring and sleeve contact sets 40.

The operation of the selector when no digit is being absorbed is as follows. When the selector is seized from the preceding selector, relay A operates (through contacts D–1 and D–2) to the loop on the incoming tip and ring leads T and R. Contact A–1 closes to operate holding relay B and contact B–1 closes to extend a holding ground back to the preceding selector. When a digit is dialed into the selector, relay A releases and reoperates as the dial pulses are received, and at each release of relay A contact A–2 closes to pulse vertical magnet 26 (through contact B–2 since slow release relay B remains operated at this time) to step the wipers up a level. At the first release of relay A, relay C also operates, through contacts A–2 and B–2, and being slow release, remains operated. In addition, when the selector steps upwar from its rest position, vertical off normal contacts VON–1 to VON–3 operate.

Operation of relay C and the VON contacts now operates rotary control relay E, through contacts B–3, C–1 and VON–1. (Relay E, incidentally, is a marginal relay and will operate only if it receives a full ground through contacts VON–1). When relay E operates, its contact E–1 closes to prepare an operate path for rotary magnet 28, but magnet 28 cannot operate during vertical stepping since contact C–2 is operated. Relay E locks operated through contacts ROT INT (which are normally closed contacts opened by operation of the rotary magnet), contact E–2 operated, and contact D–6 released.

After the last dial pulse has been received, relay A reoperates and remains operated. The selector wipers have now arrived at a tip, ring and sleeve contact set level corresponding to the digit dialed. After a short interval relay C releases and contact C–1 opens the operate path of relay E, while contact C–2 closes to energize the rotary magnet 28. A first rotary step of the wipers, to the first tip, ring and sleeve contact set on the level in question, now occurs.

Upon operation of the rotary magnet, contacts ROT INT operate to open the locking path of relay E and release this relay. When relay E releases, its contact E–1 opens the operate path for rotary magnet 28, which then also releases, permitting contacts ROT INT to close in preparation for the next rotary step of the wipers.

If the first tip, ring and sleeve contact set onto which the wipers have moved is busy, ground will be received from sleeve wiper 38. This ground will be extended through contacts D–3 released, B–4 operated, the 11th step springs 32, contacts ROT INT released, and contacts VON–1 operated, to reoperate relay E. (This ground, present at the right hand side of relay D, also prevents operation of relay D through the relay E coil.) When relay E operates, its contact E–1 closes to re-energize rotary magnet 28, and another rotary step occurs, to the next tip, ring and sleeve contact set.

If this set is not busy, no ground is received on sleeve wiper 38. After a period of time, relay D is able to operate, from ground through contact B–1, to −48 volts through the relay E coil. Relay E, being marginal, will not operate. When relay D operates, its contacts D–1, D–2 and D–3 operate to cut the incoming tip and ring leads through to the wipers (and hence to the succeeding circuit) and to extend ground forward on the sleeve lead (through contact D–3 operated) to the succeeding circuit. When the succeeding circuit is seized, it returns ground back through sleeve wiper 38 to hold relay D operated, through contact D–3 operated, relay D, the 11th step springs, contacts ROT INT released, contacts VON–1 operated, and the E relay coil to −48 volts.

Operation of contacts D–1 and D–2 also releases relay A, and after a period of time, typically 250 milliseconds, relay B releases, due to release of contact A–1. Relay D remains operated during conversation.

After conversation ends and the connection is broken, ground disappears from the sleeve wiper 38 and relay D releases. Since relays A and B are also released, release magnet 30 operates, through contacts D–4, A–3, B–4 and VON–2. When the selector has dropped to its released position, contacts VON–2 open to de-energize the release magnet.

If a digit is being absorbed, then the normal post spring contacts are used. These contacts are part of a standard normal post spring assembly which is not shown but includes the usual set of four sets of contacts (front left, front right, rear left, rear right) which ride up past respective sets of cam teeth as the selector steps vertically. If the digit "8" is to be absorbed, then a cam tooth, e.g. the left front cam tooth, is bent out at level eight to operate the left front NPS contacts when the selector steps to that level. Only three sets of NPS contacts are used in the embodiments illustrated and will be designated NPS–1 to NPS–3. In FIG. 3, only contacts NPS–1 (assumed to the rear left normal post spring contacts) are shown.

When a digit is to be absorbed, the operation is as follows. Relay F is provided and operates shortly after seizure of the selector, before dialing commences. It operates through contacts B–5 operated, C–3 released, VON–3 released, and Z–1 released and locks operated through contacts F–1 operated, Z–2 released, and B–6 operated, or through contacts F–1, B–7 and C–3 operated, when relay C operates. Relay Z, the operation of which will be described shortly, is released at this time.

If digit "8" is to be absorbed, contacts NPS–1 are bent to operate when the selector reaches that level. When the selector reaches level eight and stops there, relay C releases and ground is extended to operate the release magnet, through contacts B–1 operated, C–2 released, Z–3 released, NPS–1 operated, F–2 operated, terminal 42 and VON–2 operated. This drops the selector wipers back to their initial position without any rotary hunting, i.e. the digit "8" has been absorbed. Relays A and B remain operated.

Relay Z is provided for once-only absorption, which means in the case of digit "8" that the first "8" dialed into the selector is to be absorbed, but if the next digit dialed into the selector is an "8," this digit is not to be absorbed. This is as opposed to repeated absorption of the "8." In operation, when the first "8" is dialed and ground is extended to terminal 42 to operate the release magnet 30, relay Z operates, and locks operated through contacts Z–3 operated. This releases relay F, due to opening of contact Z–2 (contact C–3 being open at this time), and also opens the operate path for relay F, due to opening of contact Z–1.

When the next digit, e.g. an "8," is dialed, then when vertical stepping commences, relay C reoperates, and contact C–2 opens to release relay Z. However, relay F cannot now operate, because, although contact Z–1 has just closed, contacts VON–3 have just opened. With relay F released, no ground can be extended via contacts NPS–1 and F–2 to operate release magnet 30, so this second digit "8" will not be absorbed.

THE MEMORY CIRCUIT

The memory circuit as shown in FIG. 3 comprises a memory relay M having one side connected through contacts M–1, both to terminal 42 and to contact B–3, and having its other side connected to −48 volts. In addition, a source 44 of signalling potential is provided for supplying a memory signal. In the embodiment shown, source 44 provides +24 volts non-grounded battery (N.G.B.). The source 44 is connected through normally open contacts D–5 and M–2 to the ring lead. A transient signal suppression diode 46, shorted by the normally closed contact of contacts M–2, is inserted in series in the ring lead.

The operation of the memory circuit is as follows. Assume that the normal post spring contacts NPS–1 are set and relay Z is connected for once-only absorption of digit "8," and that this digit is now dialed. When the wipers 34, 36, 38 step up to level eight and stop, relay C will release and ground will be extended from contact B–1 operated through to terminal 42 to operate the release magnet 30 and drop the selector wipers back to their rest position. This ground at terminal 42 operates memory relay M.

When relay M operates, it locks operated through contacts M–1 operated and B–3 operated, and its contacts M–2 prepare a path for application of a memory signal from source 44 to the ring wiper 36. No signal is yet applied to wiper 36 since relay D has not yet operated to close contact D–5.

When the next digit is dialed, the selector steps up to a level corresponding to such next digit, and the wipers then hunt over the tip, ring and sleeve contact sets of that level until an idle set is located. (The next digit could, if desired, be an "8" since only the first "8" will be absorbed.) When the wipers come to rest on an idle set of contacts (i.e. no ground on the sleeve lead of the set) the D relay operates, as previously described, to cut through the tip and ring leads and to extend ground forward over the sleeve lead. At the same time, contact D–5 closes to extend the memory signal, i.e. +24 v. N.G.B., forward over the ring lead. Diode 46 prevents this signal from travelling back through the subscriber's loop and onto the tip lead.

As previously discussed, operation of relay D releases relay A, and contact A–1 opens the operate path of relay B. After about 250 milliseconds, relay B releases to open contact B–3, and this releases relay M. Contacts M–2 release to terminate application of the memory signal to the ring lead and to short circuit diode 46 so that the latter will not interfere with voice transmission along the ring lead.

In the result, the circuit of FIG. 3 provides a selector arrangement in which, when a non-absorbed digit is dialed into the selector, a memory signal is sent out to indicate whether a selected digit has previously been absorbed. In the embodiment shown, the absence of +24 v. N.G.B. on the ring lead indicates that the selected digit (an "8") has not previously been absorbed, and the presence of +24 v. N.G.B. on the ring lead indicates that an "8" has previously been absorbed.

TRUNK SPLITTING CIRCUIT

Figure 4:
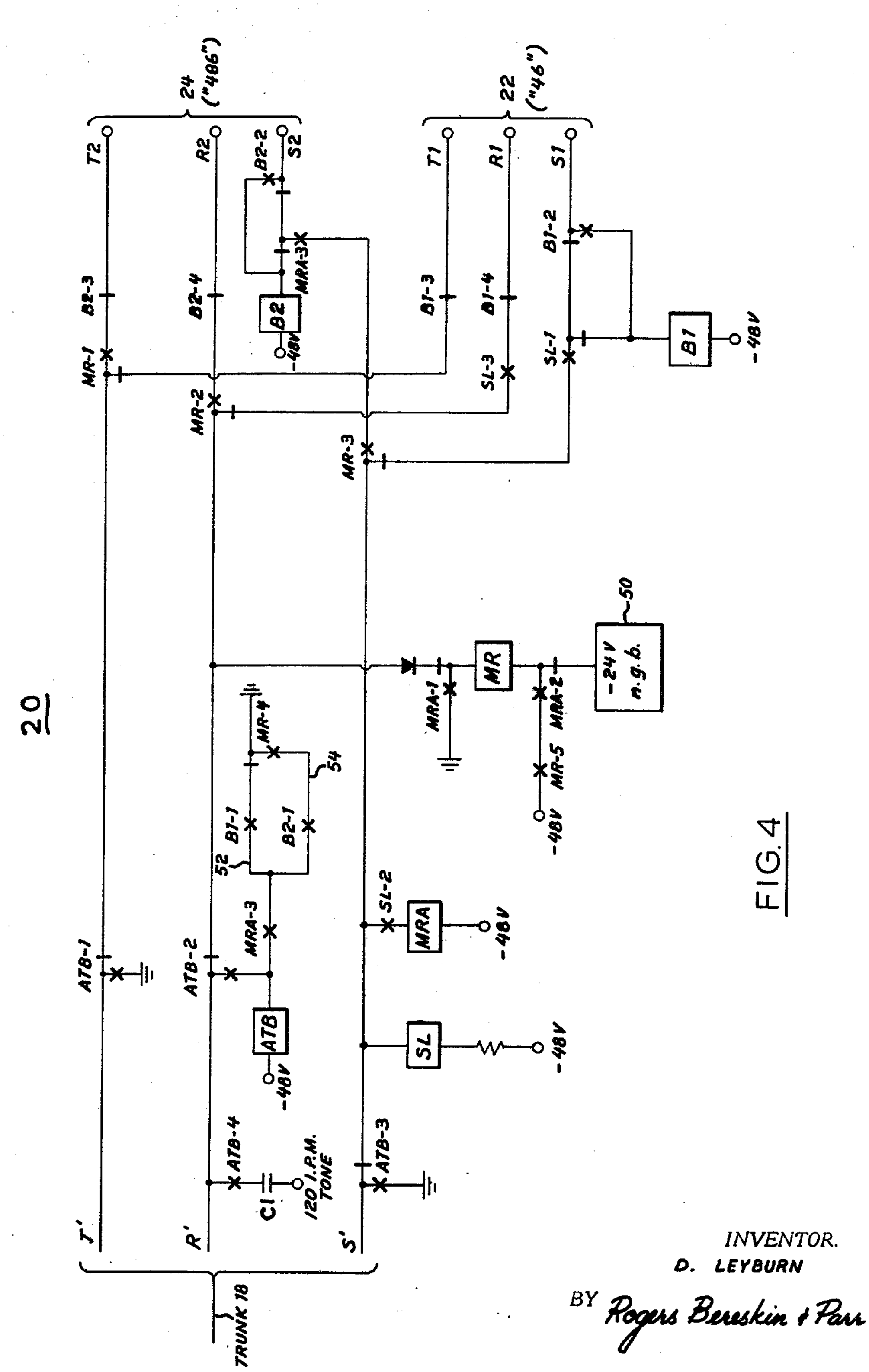
FIG. 4 shows a trunk splitting circuit adapted to cooperate with the selector memory circuit of FIG. 3.

Reference is next made to FIG. 4, which illustrates an embodiment of the trunk splitting circuit 20 adapted to cooperate with the memory equipped selector circuit of FIG. 3. The input to the trunk splitting circuit of FIG. 4 is via trunk 18 from the appropriate level of the FIG. 3 selector circuit, as shown in FIG. 2. For example, if the FIG. 3 circuit is to distinguish between dialing of "486" (the "8" being absorbed( and "46," then a number of trunk splitting circuits of the type shown in FIG. 4 will be connected, via trunks such as trunk 18, to the tip, ring and sleeve contact sets on level six of the FIG. 3 selector switch.

The trunk 18 includes leads T′, R′ and S′ incoming to trunk splitting circuit 20. These leads are switched between output 22, consisting of leads T1, R1, S1, and output 24, consisting of leads T2, R2, S2, depending on whether a memory signal is present or absent on ring lead R′. The switching is accomplished by a very fast operate memory relay MR, which operates when a memory signal appears on lead R′, and which has switching contacts MR–1, MR–2, MR–3 in the T′, R′, S′ leads to switch these leads between outputs 22 and 24 as indicated by the condition of relay MR.

The trunk splitting circuit of FIG. 4 also includes a sleeve relay SL, an auxiliary memory relay MRA, busy relays B1 and B2, an all trunks busy relay ATB, and a source 50 supplying −24 v. N.G.B. with respect to source 44. The operation of the FIG. 4 circuit is as follows.

TRUNK SPLITTING CIRCUIT OPERATION, SWITCHING TO OUTPUT 22 (NO MEMORY SIGNAL)

Assume that digit "6" has been dialed, and that the FIG. 3 selector wipers have stepped up to level six and then around to locate an idle set of tip, ring and sleeve contacts to which trunk 18 is connected. When this occurs, relay D in the selector operates and ground is extended (FIG. 3) via contacts B–1 and D–3 and sleeve wiper 38, to sleeve lead S′ to operate the sleeve relay SL (FIG. 4). Contacts SL–1 now operate to permit the ground on lead S′ to be extended to lead S1 to activate the following circuit (not shown), which is assumed not to be busy. Operation of contacts SL–1 also opens the operate path for busy relay B1.

At the same time, contact SL–2 closes to operate auxiliary memory relay MRA and contacts MRA–1 and MRA–2 operate to prepare a locking path for memory relay MR, which however has not operated since +24 v. N.G.B. did not appear on the ring lead R′. Contact MRA–3 prepares a first operate path 52 for relay ATB, the remainder of this operate path being through contacts B1–1 and MR–4. Relay ATB does not operate since busy relay B1 is released at this time.

Finally, contact SL–3 closes to cut lead R′ through to lead R1. (Contact SL–3 is provided to prevent passage of −24 v. N.G.B. from source 50 onto ring lead R1.) In the result, the input T′, R′, S′ is now extended through to output T1, R1, S1.

SWITCHING TO OUTPUT 24 (MEMORY SIGNAL PRESENT)

Assume now that the preceding selector has seized the FIG. 4 trunk splitting circuit with ground on sleeve lead S′ (as before) and with +24 v. N.G.B. on the ring lead R′, indicating that a selected digit (e.g. digit "8") has been absorbed, so that output 24 is to be selected. It is assumed that this output is not busy.

In this event, the +24 v. N.G.B. on lead R′ operates relay MR, through contact MRA–1 released. Contact MR–5 closes to prepare a locking path for relay MR, while contacts MR–1 to MR–3 operate to switch the input T′, R′, S′ to output T2, R2, S2. Contacts MR–4 operate to prepare a second operate path 54 for relay ATB, the remainder of this operate path being through contacts B2–1 and MRA–3. However, relay ATB will not operate since relay B2 remains released.

In addition, ground on lead S′ operates relay SL, but this occurs after operation of relay MR, since relay MR is much faster operate than relay SL. When relay SL operates, its contact SL–2 operates relay MRA as before, and contacts MRA–1 and MRA–2 open the operate path and complete a locking path for relay MR. At the same time, contacts MRA–3 complete the path from lead S′ to lead SL and open the operate path of busy relay B2.

The situation now is that the T′, R′, S′ input is cut through to the T2, R2, S2 output. When the circuit (e.g. another selector) at the T2, R2, S2 output is seized, ground is returned through lead S2 to hold operated both the SL relay in the trunk splitting circuit and the D relay in the preceding selector.

It may be noted that relay MRA is in effect a timing relay provided for improved reliability of the trunk splitting circuit. Relay MRA provides a delay to ensure that memory relay MR is fully operated before the operate path of relay MR is opened and its locking path is closed. Relay MRA could be eliminated, with contacts of relay SL controlling the operate and locking paths of relay MR, but then the system would fail to function if the operate time of relay MR deteriorated so that relay MR were not fully operated by the time relay SL operated.

CIRCUIT OPERATION, ALL OUTGOING TRUNKS BUSY

One or both outputs from the FIG. 4 trunk splitting circuit will typically be connected to outgoing circuits by rotary out trunk switches (not shown). In the event that, prior to seizure of the trunk splitting circuit from the preceding selector, all outgoing trunks at output 22 of the trunk splitting circuit should become busy, then ground will appear on sleeve lead S1. This ground will operate busy relay B1, through contacts B1–2 released and SL–1 released. Busy relay B1 then locks operated to sleeve lead S1, and its contacts B1–2, B1–3, B1–4 open the path between the incoming T′, R′, S′ leads and leads T1, R1, S1. At the same time, contact B1–1 closes to prepare the first operate path 52 for relay ATB.

Alternatively, or at the same time, if all trunks at output 24 should become busy, ground will appear on lead and operate busy relay B2, which then locks operated to lead S2 through contacts B2–2. Contacts B2–3, B2–4 and B2–2 in operating prevent completion of a path from leads T′, R′, S′ to leads T2, R2, S2. Contacts B2–1 closes to prepare the second operate path 54 from relay ATB.

OUTPUT 22 BUSY

Assume that, before the trunk splitting circuit is seized, all outgoing trunks at output 22 become busy so that busy relay B1 has operated, as described. Next assume that the circuit is seized only with ground on the sleeve lead, i.e. no +24 v. N.G.B. on the ring lead, so that output 22 is to be selected.

In this event, when the circuit is seized, relay SL operates, as before, to the incoming ground on lead S′ and contact SL–2 operates relay MRA as before. When relay MRA operates, its contact MRA–3 completes the first operate path 52 for relay ATB, since contact B1–1 is operated and contacts MR–4 are released.

When relay ATB operates, its contacts ATB–1 and ATB–2 operate to lock relay ATB to the incoming loop in leads T′, R′ and to disconnect these leads from the outputs. Contacts ATB–3 disconnect lead S′ from the outputs and connect ground to lead S′ to hold the incoming connection. Contact ATB–4 closes to connect (through capacitor C1) all trunks busy tone to the incoming loop.

It may be noted that contacts B1–3, B1–4 and B1–2, in opening the path between leads T′, R′, S′ and leads T1, R1, S1 before relay ATB operates to perform a similar function, provide a safeguard against accidental connection of the leads T′, R′, S′ through leads T1, R1, S1 to succeeding equipment before relay ATB can operate.

If output 22 is busy as before but the circuit is seized with +24 v. N.G.B. on the ring lead, indicating that output 24 is to be used, then relay MR operates before relay MRA operates, and contacts MR–4 operate to open the first operate path 52 for relay ATB. If output 24 is not busy, so that busy relay B2 is released, the second operate path 54 for relay ATB remains open and relay ATB will not operate. Circuit operation then proceeds as previously described for switching to the T2, R2, S2 output.

OUTPUT 24 BUSY

Assume next that all outgoing trunks are busy at output 24 but not at output 22. Relay B2 thus operates and locks operated to sleeve lead S2, contacts B2–2 to B2–4 then preventing completion of a path from leads T′, R′, S′ to leads T2, R2, S2. Contacts B2–1 closes to prepare operate path 54 for relay ATB.

If in this situation the trunk splitting circuit is seized without +24 v. N.G.B. on the R′ lead (i.e. output 22 to be selected), relay MR remains released, contacts MR–4 remain released, and operate paths 52 and 54 for the ATB relay both remain open. Leads T′, R′, S′ are thus extended through to leads T1, R1, S1 as previously described.

If, on the other hand, the circuit is seized with +24 v. N.G.B. on the lead R′ (output 24 to be selected), then relay MR operates and contacts MR–4 in operating prepare the operate path 54 for relay ATB. Since contact B2–1 is operated at this time, relay ATB operates as soon as relay MRA operates to close contact MRA–3. The ATB relay, as before, locks operated to the incoming loop, provides further disconnection of leads T′, R′, S′ from out outputs, provides ground on lead S′ to hold the incoming connection and provides all trunks busy tone to the incoming loop.

Thus, if the FIG. 4 trunk splitting circuit is seized with a memory signal indicating that one of the outputs is to be used, all trunks busy tone will be sent back to the calling subscriber only if that output is busy and not if only the other output is busy.

Reference is again made to FIG. 3, where it will be noted (as mentioned) that no +24 v. N.G.B. potential is placed on the ring wiper 36 until the wipers have located an idle set of tip, ring and sleeve contacts to operate the selector D relay and close contact D–5. Contact D–5 is not absolutely essential and could be eliminated, but it serves as an added safeguard. If contact D–5 were not present, so that +24 v. N.G.B. were applied to the ring wiper during its rotary hunting, then this +24 v. N.G.B. could possibly erroneously activate the memory relay MR in another trunk splitting circuit just in the process of being seized at that time from another selector. The presence of contact D–5 in the circuit for the +24 v. N.G.B. prevents this possibility.

DOUBLE MEMORY CIRCUIT

The selector memory circuit of FIG. 3 may be termed a single memory circuit. It differentiates between absorption and non-absorption of only one selected digit. It does this by providing a first signalling condition of the tip, ring and sleeve wipers when a non-absorbed digit is dialed into the selector and the selected digit has previously been absorbed (+24 v. N.G.B. on the ring wiper), and a second signalling condition of the wipers (absence of +24 v. N.G.B. on the ring wiper) when a non-absorbed digit is dialed and the selected digit has not previously been absorbed.

The principles of the FIG. 3 circuit may be applied to construct a double memory circuit, i.e. one that will differentiate between absorption and non-absorption of either of two selected digits. Such a double memory circuit will provide a first signalling condition of the wipers when a first selected digit is absorbed, a second signalling condition of the wipers when a second selected digit is absorbed, and a third signalling condition of the wipers when neither of the two selected digits is absorbed. This memory circuit can be used with a three way trunk splitting circuit that will route to one output when the first selected digit has been absorbed, a second output when the second selected digit has been absorbed, and a third output when neither of these two digits has been absorbed.

Figures 5, 5A:
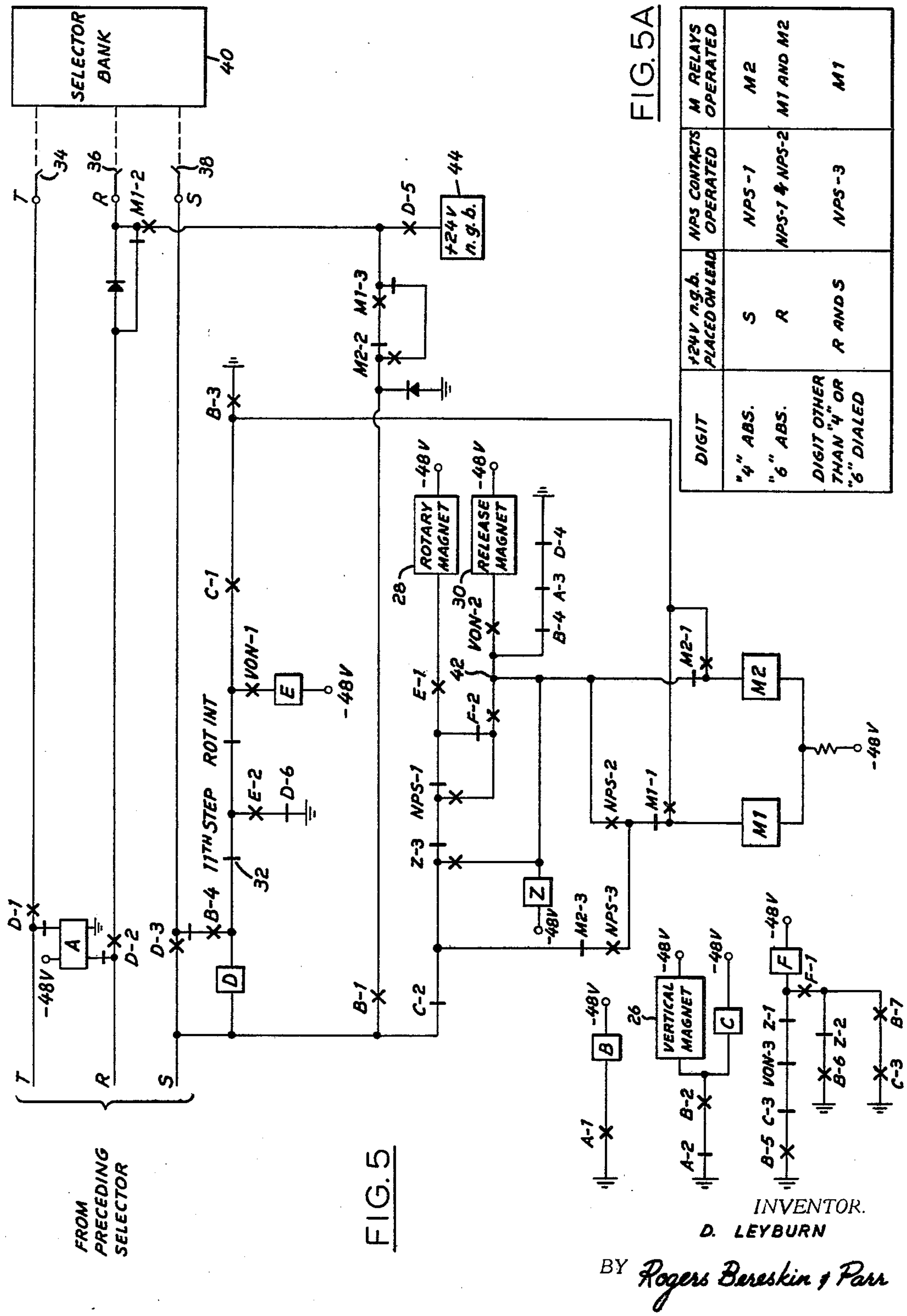
FIG. 5 shows a portion of a selector circuit modified to include a double memory circuit according to the invention.
FIG. 5A is a table showing how the normal post spring contacts and memory relays of the FIG. 5 circuit operate to provide various memory signals.

FIG. 5 illustrates a portion of a conventional selector circuit modified to provide a double memory. The basic selector circuit shown in FIG. 5 is the same as that of FIG. 3, the operation being exactly the same, and like reference numerals indicate like parts. In addition to normal post spring contacts NPS–1, however, two further sets of contacts NPS–2 and NPS–3 (the front left and front right normal post spring contacts respectively) are shown. The FIG. 5 circuit also contains two memory relays M1 and M2, operation of which will provide the various signalling conditions desired on the tip, ring and sleeve wipers.

The choice of digits to be absorbed with corresponding generation of appropriate memory signals depends on the use desired for the double memory circuit. It is assumed for purposes of explanation that the FIG. 5 selector circuit is set to absorb only digits "6" and "4," as follows: Contacts NPS–1 and NPS–2 are set to close if digit "6" is dialed, contacts NPS–1 are set to close if digit "4" is dialed, and contacts NPS–3 are set to close if a digit other than "6" or "4" is dialed.

The choice of signals to be applied to the wipers is largely arbitrary, but as will be explained, the signals applied to the wipers in the exemplary circuit of FIG. 5 are as follows: (a) When digit "6" has been absorbed, +24 v. N.G.B. will be applied to the ring wiper (upon dialing of a further non-absorbed digit, which could be another "6") and this is accomplished by operating relays M1 and M2. (b) When the digit "4" has been absorbed, +24 v. N.G.B. will be applied to the sleeve wiper (upon dialing of a further non-absorbed digit) and this will be accomplished by operating relay M2. (c) When a non-absorbed digit is dialed and no digit has previously been absorbed, +24 v. N.G.B. is placed on both the ring and sleeve wipers, by operation of relay M1. This is shown in tabular form in FIG. 5A.

In more detail, the operation of the FIG. 5 circuit is as follows.

FIRST SELECTED DIGIT ("6") ABSORBED

Assume that the FIG. 5 selector has just been seized from the preceding selector (not shown) so that relays A and B have thus operated, and that digit "6" is now dialed into the selector. When the selector wipers reach level six, contacts NPS–1 and NPS–2 close, and since the incoming dial pulses now terminate, relay C releases to close contact C–2, and ground is extended from contact B–1 operated to terminal 42 to operate release magnet 30 and drop the selector wipers back to their initial position. At the same time, the ground at terminal 42 operates relay M1 through contacts NPS–2 operated and M1–1 released, and operates relay M2 through contact M2–1 released. Relays M1 and M2 then lock operated through contacts M1–1 and M2–1 respectively, and contact B–3 operated. Contact M1–2 prepares a path for application of +24 v. N.G.B. to the ring wiper 36, while contacts M1–3 and M2–2 both operated prevent application of +24 v. N.G.B. through contacts B–1 operated to the sleeve wiper 38.

Next assume that a further digit is dialed. This further digit will not be absorbed, and after the selector wipers have stepped up and around to locate an idle set of tip, ring and sleeve contacts, relay D will operate to close contact D–5 and place +24 v. N.G.B. on the ring wiper 36. After a short time, relay B will release to release relays M1 and M2 and remove the +24 v. N.G.B. from the ring wiper.

SECOND SELECTED DIGIT ("4") ABSORBED

Assume that the FIG. 5 selector has just been seized and that digit "4" is now dialed into the selector. When the selector reaches level four, contacts NPS–1 close, but contacts NPS–2 (and NPS–3) remain open since they have not been set to close when the selector reaches the fourth level. When relay C releases, ground from contact B–1 is extended to terminal 42 to operate release magnet 30 and also to operate relay M2, which locks operated. Relay M1 cannot operate since contacts NPS–2 and NPS–3 are open. Operation of contacts M2–2 prepares a path for application of +24 v. N.G.B. to sleeve wiper 38.

Then, when a further (non-absorbed) digit is dialed and the selector wipers have located an appropriate idle set of tip, ring and sleeve contacts, relay D will operate to close contacts D–5 and D–3 and +24 v. N.G.B. will be applied to the sleeve wiper through contacts D–5 operated, M1–3 released, M2–2 operated, B–1 operated, and D–3 operated. When relay B releases, this potential will be removed from the sleeve wiper.

It may be noted that if this further non-absorbed digit is any digit other than a "4" or a "6," then contacts NPS–3 will close when the selector wipers reach a level corresponding to such further digit. However, closing of contacts NPS–3 has no effect at this time since contact M2–3 is open (since relay M2 is operated) and thus ground cannot pass from contacts B–1 and C–2 through contacts NPS–3 to operate relay M1. If the further digit is a "4" or a "6," contacts NPS–3 remain open but one or both of contacts NPS–1 and NPS–2 will close, but this will have no effect on relay M1 since relay F remains released (as previously described) preventing ground from reaching 42.

NEITHER DIGIT ABSORBED

Assume that the FIG. 5 selector has just been seized and that a digit other than "6" or "4" e.g. digit "1," is dialed. No digit has previously been dialed and absorbed by the FIG. 5 selector.

In this event the selector wipers will step up to and stop at the first level tof tip, ring and sleeve contacts 40. Contacts NPS–3 now close. After reoperation of the relay following the single dial pulse, relay C releases and ground is extended via contacts B–1 operated, C–2 released, M2–3 released, NPS–3 operated, and M1–1 released to operate relay M1, which then locks operated through contact B–3. Relay M–2 does not operate since contacts NPS–1 and NPS–2 are open.

When relay M1 operates, its contact M1–2 prepares a path for application of +24 v. N.G.B. to ring wiper 36, and its contact M1–3 prepares a path for application of +24 v. N.G.B. to the sleeve wiper 38.

Rotary hunting of the wipers on level one now commences, and when an idle set of tip, ring and sleeve contacts is located, relay D operates, closing contacts D–5 and D–3 to apply +24 v. N.G.B. to the ring and sleeve wipers. When relay B releases to open contacts B–1 and B–3 and releases relay M–1, application of +24 v. N.G.B. to the wipers is terminated.

In the result, the FIG. 5 double memory circuit provides three different signalling conditions of the tip, ring and sleeve wipers (and therefore of the outgoing leads, not shown, connected to these wipers) to indicate, when a non-absorbed digit is dialed, whether one of two selected digits has previously been absorbed.

TYPICAL APPLICATION FOR DOUBLE MEMORY CIRCUIT

Figures 7, 7A:
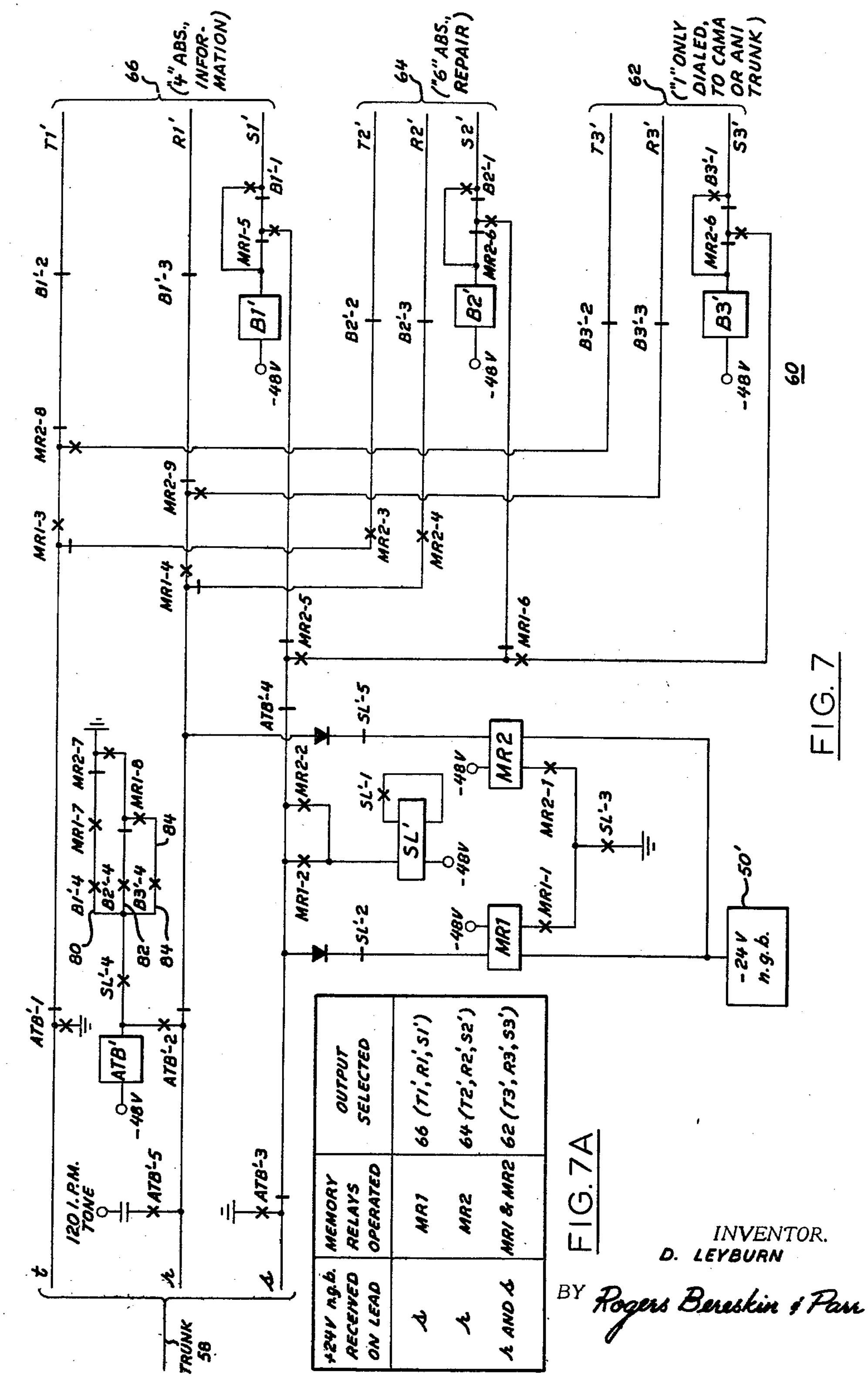
FIG. 7 shows a three way trunk splitting circuit adapted to cooperate with the FIG. 5 selector memory circuit.
FIG. 7A is a table showing the memory relays operated and the outputs selected on the FIG. 7 circuit dependent on the input memory signal.

Reference is next made to FIG. 6, which shows a typical application for the FIG. 5 memory circuit in combination with a three way trunk splitting circuit to be described shortly and shown in FIG. 7. The FIG. 6 arrangement shows a plan for providing "411" and "611" service codes (information and repair respectively) while providing digit "1" ANI/CAMA access. The situation with which the FIG. 7 arrangement deals is that it is desired to absorb the "4" and the "6" in the "411" and "611" service codes and yet still route subscribers dialing these codes to their appropriate destination while at the same time directing a subscriber who dials only the digit "1" to an ANI or CAMA trunk for direct distance dialing. It will be apparent that if, when a subscriber dials "411," the digit 4 is absorbed, then the next digit to which the selector will react is the "1," and if no indication is provided that digit "4" has been absorbed, the call will be routed to an ANI or CAMA trunk instead of to an information trunk, which is undesirable.

The FIG. 6 arrangement overcomes this difficulty as follows. A first selector 56 is provided, equipped with the memory circuit of FIG. 5. The tip, ring and sleeve contact sets at level one of this selector are connected to three way trunk splitting circuits, one connecting trunk 58 and one three way trunk splitting circuit 60 being shown in FIG. 6. The trunk splitting circuit 60 has three outputs of 62, 64 and 66. Output 62 is connected through rotary out trunk switches (R.O.T.S.) diagrammatically indicated at 68, to an ANI or CAMA trunk 70 leading to an appropriate toll centre. Output 64 is connected through R.O.T.S. 72 to a repair trunk 74, while output 66 is connected through R.O.T.S. 76 to an information trunk 78.

In operation, if the subscriber dials simply a "1" into selector 56 (no digit previously absorbed) relay M1 will operate and the subscriber will be connected via level one of the selector to trunk splitting circuit 60 with +24 v. N.G.B. on the ring and sleeve leads of trunk 58. Circuit 60 will react to this situation to route the call to output 62, to the ANI or CAMA trunk 70. If the subscriber dials "61," the "6" is absorbed, with relays M1 and M2 operating, and the "1" then effects connection of the subscriber via trunk 58 to circuit 60, with +24 v. N.G.B. placed on the ring lead of trunk 58. Circuit 60 reacts to this signal by routing the call to output 64, to the repair trunk 74. If the subscriber dials "41," the "4" is absorbed with operation of relay M2, and the "1" effects connection of the subscriber via trunk 58 to circuit 60 with +24 v. N.G.B. on the sleeve lead of trunk 58. Circuit 60 reacts to this signal by routing the call to output 66, to the information trunk 78.

THREE WAY TRUNK SPLITTING CIRCUIT

Reference is next made to FIG. 7, which shows in detail the three output trunk splitting circuit 60 of FIG. 6. The trunk splitting circuit of FIG. 7 is very similar in many respects to that of FIG. 4, and in general, primed reference numerals indicate like parts.

More specifically, the circuit 60 includes leads *t, r, s* incoming from the trunk 58. These leads are switched either to output 66, having leads T1′, R1′, S1′; to output 64 having leads T2′, R2′, S2′; or to output 62 having leads T3′, R3′, S3′, depending on the signalling condition of the incoming leads. The switching is accomplished by very fast operate memory relays MR1 and MR2 provided with contacts for switching the input to any desired output. The trunk splitting circuit 60 also includes a sleeve lead relay SL′ (operative after seizure of circuit 60 with ground on lead *s*), busy relays B1′, B2′ and B3′, an all trunks busy relay ATB′, and a source 50′ supplying —24 v. N.G.B. with respect to the source 44 in FIG. 4. The operation of the FIG. 7 circuit will now be described, and the description should be read with reference to FIG. 7A, which shows in tabular form the memory relay or relays operated and the output selected, for each signalling condition of leads *t, r, s*.

SWITCHING TO OUTPUT 66 (+24 v. N.G.B. ON LEAD s)

Assume that trunk splitting circuit 60 is seized with +24 v. N.G.B. on lead *s*. This potential then operates relay MR1, through contact SL′–2. Relay MR–2 remains released since no +24 v. N.G.B. has been received on the *r* lead.

When relay MR1 operates, contact MR1–1 closes to prepare a locking path for relay MR1, and contact MR1–2 closes to prepare an operate path for relay SL′. Contacts MR1–3, MR1–4, MR1–5 operate to switch the input through to the T1′, R1′, S1′ output, contact MR1–5 at the same time opening the operate path for busy relay B1′. Contact MR1–6 prepares a path for switching of lead *s* to lead S2′, but no such switching occurs since relay MR2 is released at this time.

In addition, contact MR1–7 closes to prepare a first operate path 80 for relay ATB′, while contacts MR1–8 operate in second and third operate paths 82 and 84 for relay ATB′. The operation of relay ATB′ will be described presently.

The ground on lead *s* from the preceding selector now operates relay SL′, through contact MR1–2 operated. When relay SL′ operates, contact SL′–1 closes causing relay SL′ to be slow release, while contacts SL′–2 and SL′–3 operate to open the operate path and close a locking path for relay MR1. It may be noted that in the FIG. 7 circuit, relay SL′ cannot operate to open the operate path of relay MR1 (or MR2) until relay MR1 (or M2) has operated, and thus there is no need for a special relay (such as relay MRA of FIG. 4) to ensure that relay MR1 has operated before its operate path is opened and its locking path is closed. On the other hand, since relay SL′ can never operate until either relay MR1 or relay MR2 has operated, it is necessary in this arrangement to operate one or both of the relays even when no digit has been absorbed, and this is why the memory circuit of FIG. 6 is constructed to provide +24 v. N.G.B. on the ring and sleeve wipers when no digit has been absorbed.

Operation of relay SL′ also closes contact SL′–4, further preparing the operate paths for relay ATB, but relay ATB does not operate since output T1′, R1′, S1′ is assumed not to be busy at this time. In the result, leads *t, r, s* are cut through to leads T1′, R1′, S1′, and ground will then be returned on leads S1′ to hold relay AL′ and the preceding selector.

SWITCHING TO OUTPUT 64 (+24 v. N.G.B. ON LEAD r)

The operation here is similar to operation with +24 v. N.G.B. on lead *s* except that relay MR–2 now operates instead of relay MR–1. Contacts MR2–1 and MR2–2 then close to prepare respectively a locking path for relay MR2 and an operate path for relay SL′. Contacts MR2–3, MR2–4 operate to switch leads *t, r,* to leads T2′, R2′ respectively (relay MR1 being released) while contacts MR2–5 and MR2–6 switch lead *s* to lead S2′. Contact MR2–6 at the same time opens the operate path for busy relay B2′.

In addition, contacts MR2–7 operate in the operate paths 82 and 84 for relay ATB′.

Ground on lead *s* from the preceding selector now operates relay SL′; contact SL1′ causes relay SL′ to be slow release as before, and contacts SL′–5 and SL′–3 open the operate path and close a locking path for relay MR2. Contact SL′–4 further prepares the operate path for the ATB′ relay, but relay ATB′ does not operate since output T2′, R2′, S2′ is assumed not to be busy. The result is that the *t, r, s,* input is cut through to output T2′, R2′, S2′.

SWITCHING TO OUTPUT 62 (+24 v. N.G.B. ON r AND s LEADS)

This occurs, in the example of FIG. 6, when a "1" is dialed and neither of the selected digits has previously been absorbed. In this case, relays MR1 and MR2 both operate. Lead *t* is switched to lead T3' through conatcts MR1–3 and MR2–8 operated; lead *r* is switched to lead R3' through contacts MR1–4 and MR2–9 operated, and lead *s* is switched to lead S3' through contacts MR2–5, MR1–6, and MR2–10 operated. Contact MR2–10 also serves to open the operate path of busy relay B3'.

The remainder of the operation, including operation of relay SL' and locking of relays MR1 and MR2 is substantially the same as described for switching to the other outputs, so that further description here is unnecessary.

ALL OUTGOING TRUNKS BUSY

If all ougoing trunks at output 66 are busy, ground will appear on lead S1' and operate busy relay B1'. Contacts B1'–1 then operate to lock relay B1' to lead S1' and to prevent connection of lead *s* to lead S1', while contacts B1'–2 and B1'–3 prevent connection of leads *t, r,* to leads T1', R1'. Contact B1'–4 closes to prepare the first operate path 80 for relay ATB'.

Similarly, if all trunks at output 64 are busy, relay B2' operates and locks operated through contacts M2'–1. Contacts B2'–1, B2'–2, B2'–3 prevent connection of leads *s, t, r,* respectively to leads S2', T2', R2', and contact B2'–4 closes to prepare the second operate path 82 for relay ATB'.

If all trunks at output 66 are busy, relay B3' operates and locks operated through contacts B3'–1. Contacts B3'–1, B3'–2, B3'–3 prevent connection of leads *s, t, r,* respectively to leads S3', T3', R3', and contact B3'–4 closes to prepare the third operate path 84 for relay ATB'.

OUTPUT 66 BUSY

In operation, if output 66 is busy, and then the circuit 60 is seized with +24 v. N.G.B. on lead *s* (indicating that output 66 is to be selected), relay MR1 will operate to close contact MR1–7 in the first operate path 80 of relay ATB'. Contact B1'–4 in this operate path is already closed. As soon as relay SL' operates to close contact SL'–4, relay ATB' operates. When relay ATB' operates, its contacts ATB'–1 and ATB'–2 operate to lock relay ATB' to the incoming loop on leads *t, r,* and to disconnect these leads from the outputs. Contacts ATB'–3 and ATB'–4 disconnect lead *s* from the outputs and contacts ATB'–3 also provide ground on lead *s* to hold the incoming connection. Contact ATB'–5 closes to connect all trunks busy tone to the incoming loop.

If output 66 is busy and outputs 64 and 62 are free, as before, the circuit is seized with +24 v. N.G.B. on lead *r* only (indicating selection of output 64) then relay MR2 operates instead of relay MR1. Relay ATB' cannot now operate when relay SL' operates, since none of the three operate paths 80, 82, 84 is completed. Path 80 remains open because contact MR1–7 is released, while paths 82 and 84 remain open since contacts B2–4 and B3–4 remain released. Similarly, if the circuit is seized with +24 v. N.G.B. on leads *r* and *s* (indicating selection of output 62), relays MR1 and MR2 operate, and operation of contacts MR2–7 open operate path 80 for relay ATB. Paths 82 and 84 remain open as before.

OUTPUT 64 BUSY

If output 64 only is busy, and the circuit is seized with +24 v. N.G.B. on lead *r* only (indicating selection of output 64), then relay MR–2 operates and operate path 82 for relay ATB is completed when relay SL' operates, due to operation of contacts B2–4 and MR2–7 with contacts MR1–8 released.

If the circuit is seized with +24 v. N.G.B. on lead *s* only (output 66 to be selected), relay MR1 operates instead of relay MR2, and contacts MR2–7 released prevent completion of operate path 82 for relay ATB'. Contacts B1'–4 and B3'–4 released prevent completion of paths 80 and 84, and relay ATB' does not operate.

If the circuit is seized with +24 v. N.G.B. on leads *r* and *s* (indicating selection of output 62) then relays MR1 and MR2 operate. Contacts MR1–8 operated prevent completion of path 82 for relay ATB', and paths 80 and 84 remain open due, inter alia, to contacts B1'–4 and B3'–4 released. Therefore, relay ATB' cannot operate.

OUTPUT 62 BUSY

If output 66 only is busy, and the circuit is seized with +24 v. N.G.B. on leads *r* and *s* (indicating selection of output 62), then relays MR1 and MR2 operate, and operate path 84 for relay ATB' is completed when relay SL' operates, due to operation of contacts MR2–7, MR1–8 and B3'–4.

If the circuit is seized with +24 v. N.G.B. on lead *r* only (output 64 to be selected) or lead *s* only (output 66 to be selected) then one of relays MR1 and MR2 will remain released to prevent completion of operate path 84, and relay ATB' will remain released.

Thus, if the FIG. 7 trunk splitting circuit is seized with a memory signal indicating that one of its outputs are to be used, all trunks busy tone will be supplied if that output is busy but not if that output is free, even if other outputs are busy at the time.

MODIFICATIONS

It will be realized that although the signalling potential (+24 v. N.G.B.) has in the foregoing embodiments been applied only to ring and sleeve leads it could equally as well be applied to the tip lead, with a memory relay in the trunk splitting circuit connected to the tip lead.

Further, the particular manner in which this potential is used to indicate various events can be varied. For example, a memory circuit could be constructed to provide a +24 v. N.G.B. potential on one or more of the tip, ring and sleeve wipers when a selected digit is not absorbed and no such potential on any of the wipers when the selected digit is absorbed. The FIG. 5 memory circuit would accomplish this result if the connection from contact D–5 through contact M1–2 to the ring wiper 36 were removed. Assuming that contacts NPS–1 and NPS–2 were then set to operate only on absorption of a "6" the FIG. 5 memory circuit so modified would provide +24 v. N.G.B. on the sleeve wiper if a non-absorbed digit were dialed with digit "6" not having been previously absorbed, and would not place any potential on the sleeve wiper if a non-absorbed digit were dialed with digit "6" having previously been absorbed.

In other words, either the presence or the absence of +24 v. N.G.B. on one or more of the tip, ring and sleeve wipers will constitute a memory signal indicating the absorption or non-absorption of a selected digit, provided that a different signal is used to indicate a different condition. The trunk splitting circuit will be connected to cooperate as desired with the particular memory signalling used.

It will be realized that a number of permutations are possible in applying +24 v. N.G.B. to the tip, ring and sleeve wipers. More specifically, eight different signalling combinations are possible, i.e. +24 v. N.G.B. could be applied to (1) the tip wiper (2) the ring wiper (3) the sleeve wiper (4) the tip and ring wipers (5) the tip and sleeve wipers (6) the ring and sleeve wipers (7) the tip, ring and sleeve wipers (8) none of the wipers. It would thus be possible to indicate, upon dialing of a non-absorbed digit, whether any of seven selected digits had been absorbed, and if so, which digit.

It will also be apparent that memory signals other than +24 v. N.G.B. may be used, either alone or together with the +24 v. N.G.B. This can be used to increase the number of different signals that can be sent forward. For example, different non-grounded battery potentials could be used, reverse polarity non-grounded battery potentials could be used, or A.C. signalling could be employed if compatible with the remainder of the system. Use of a non-grounded battery is convenient, however, since interference with the rest of the system can easily be minimized and since complex equipment is not required. In addition, telephone relays are typically designed to operate with 48 volts, and use of plus and minus 24 v. N.G.B. permits use of conventional relays in the memory circuits.

It is not essential that relays be used for switching the memory signalling potentials; other means, such as flip-flops or other electronic switches, could be used.

Figure 8:
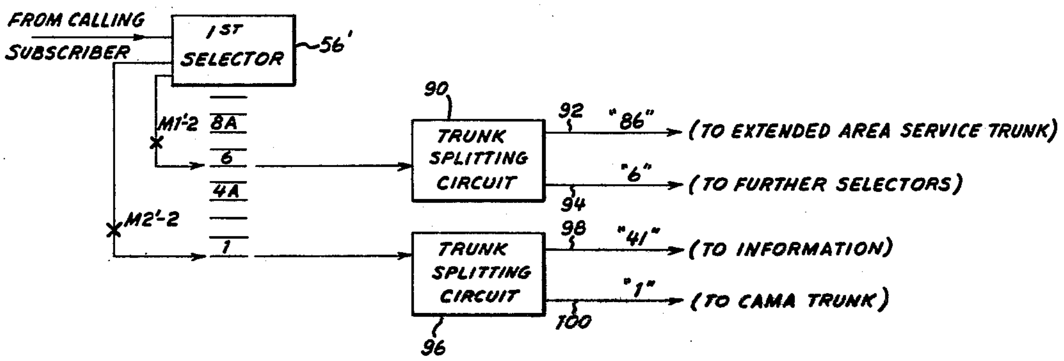
FIG. 8 shows another typical application of the invention.
Figure 9:
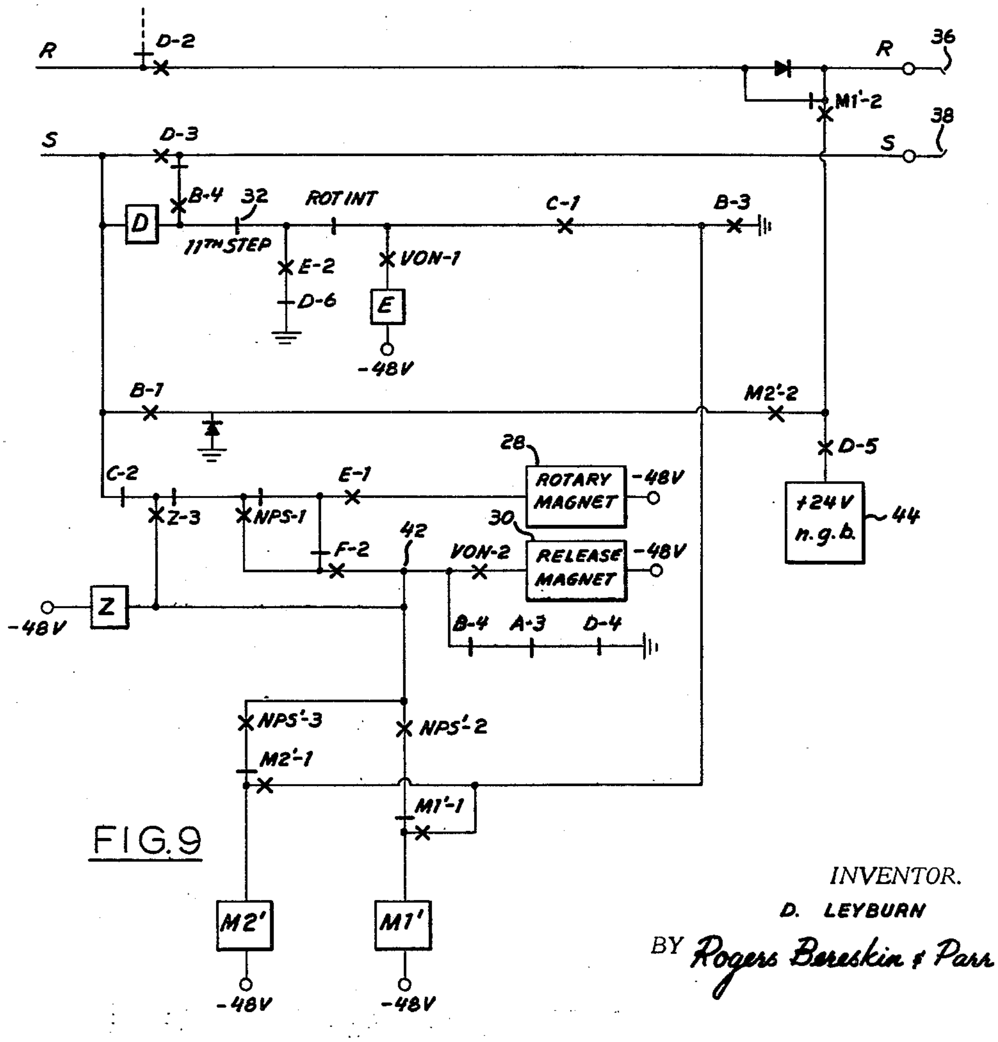
FIG. 9 shows a portion of a selector memory circuit used in the FIG. 8 application.

The possible applications for the combined selector memory circuit and trunk splitting circuits are many in number. A typical further application, combining a double memory circuit with two two-output trunk splitting circuits, is shown in FIG. 8, with parts of the memory circuit shown in FIG. 9. The selector memory circuit 56' of FIG. 9 is identical with that of FIG. 3, except that contacts NPS–1 are set to close when digit "8" or "4" is dialed, and relay M is replaced by relays M1' and M2' operating respectively through contacts NPS'–2 (set to close when "8" is dialed) and NPS'–3 (set to close when "4" is dialed). Operation of relay M1' closes contact M1'–2 to place +24 v. N.G.B. in the selector ring wiper, while operation of relay M2' closes contact M2'–2 to place +24 v. N.G.B. on the selector sleeve wiper.

In the FIG. 8 arrangement, if a subscriber dials "86," the "8" is absorbed with consequent operation of relay M1', and when the "6" is dialed, the subscriber is connected to a two output trunk splitting circuit 90 (the same as that of FIG. 4) with +24 v. N.G.B. on the ring lead of the input to circuit 90. He is thus connected to a first output 92 of circuit 90, e.g. to an extended area service (EAS) trunk. If the subscriber dials only "6," and not "86," relay M1' does not operate and he is routed to output 94 of circuit 90, e.g. to further selectors.

If the subscriber dials "41," the "4" is absorbed with consequent operation of relay M2', and when the "1" is dialed, the subscriber is connected to a trunk splitting circuit 96. Circuit 96 is the same as that of FIG. 4 except that its memory relay operates from the sleeve instead of the ring lead. The circuit 96 reacts to the memory signal to route the subscriber to its output 98, e.g. to an information trunk. If the subscriber dials simply "1" and not "41," relay M2' does not operate and he is connected via output 100 of circuit 96 e.g. to an EAS or CAMA trunk.

In the memory circuit of selector 56' it will be noted that no signalling potential is applied to the selector wipers when a non-absorbed digit is dialed and no digit has previously been absorbed.

What I claim is:

1. In a telephone selector switch of the type including outgoing tip, ring and sleeve leads, and digit absorbing means for absorbing a selected digit, said selector operating and signalling with predetermined potentials, the improvement comprising a memory circuit for providing, upon non-absorbing response by said selector switch to receipt of a digit, a memory signal to indicate whether said selected digit has previously been absorbed, said memory circuit comprising:

(a) memory means having a first operating condition and a second operating condition, said memory means being coupled to said digit absorbing means and being responsive to operation thereof to assume said first operating condition when said selected digit is absorbed and said second operating condition when said selected digit is not absorbed, (b) means, for connection to a signal source, for supplying a signalling potential different from said predetermined potentials, (c) and switching means responsive to the condition of said memory means for selectively coupling said means (b) to at least one of said tip, ring and sleeve leads when said memory means is in one of its operating and for isolating said means (b) from said one of said tip, ring and sleeve leads when said memory means is in the other of its operating conditions, thereby to indicate by said signalling potential over said one of said tip, ring and sleeve leads whether said selected digit has been absorbed.

2. Apparatus according to claim 1 wherein said predetermined potentials are referenced to ground, and said signal source is isolated from ground so that said signalling potential is floating with respect to ground.

3. In a telephone selector switch of the type including:

(a) a plurality of outgoing tip, ring and sleeve contact sets arranged in a plurality of levels, (b) tip, ring and sleeve wipers cooperating with said tip, ring and sleeve contact sets, (c) digit absorbing means for absorbing a selected digit, (d) receipt by said selector switch of dial pulses indicating dialing of a non-absorbed digit causing said wipers to step to a level controlled by the number of said dial pulses, said wipers then testing the tip, ring and sleeve contact sets on said level to locate and seize an idle set of said tip, ring and sleeve contacts, said selector operating and signalling with predetermined potentials, the improvement comprising a memory circuit for providing, on said idle tip, ring and sleeve contact set seized by said wipers upon dialing of said non-absorbed digit, a memory signal indicative of whether said selected digit has previously been absorbed, said memory circuit comprising:

(e) memory mean having a first operating condition and a second operating condition, said memory means being coupled to said digit absorbing means and being responsive to operation thereof to assume said first operating condition when said selected digit is absorbed and said second operating condition when said selected digit is not absorbed, (f) means, for connection to a signal source, for supplying a signalling potential different from said predetermined potentials, (g) and switching means responsive to the condition of said memory means for selectively coupling said means (f) to at least one of said tip, ring and sleeve wipers when said memory means is in one of its operating conditions and for isolating said means (f) from said one of said tip, ring and sleeve wipers when said memory means is in its other operating condition, thereby to indicate by said signalling potential at said one of said tip, ring and sleeve wipers whether said selected digit has been absorbed.

4. Apparatus according to claim 3 wherein said switching means includes delay means responsive to seizure of said idle set of tip, ring and sleeve contacts by said wipers, said delay means enabling application of said signalling potential to said tip, ring and sleeve wipers only after such seizure.

5. Apparatus according to claim 3 wherein said memory circuit includes means coupled to said memory means and responsive to said seizure of said idle set of tip, ring and sleeve contacts by said wipers to initiate termination of application of said signalling potential to said tip, ring and sleeve wipers, thus to limit the duration of application of said signalling potential to said tip, ring and sleeve wipers.

6. Apparatus according to claim 3 wherein:

(h) said memory means comprises a memory relay operative upon operation of said digit absorbing means, and locking means for providing a locking path for said memory relay upon operation of said memory relay, (i) and said switching means comprises circuit means connected between said means (f) and said at least one of said tip, ring and sleeve wipers, said circuit means including a normally open contact of said memory relay.

7. Apparatus according to claim 6 wherein said selector switch includes a seizure relay operative upon location of said idle set of tip, ring and sleeve contacts by said wipers, and said circuit means includes a normally open contact of said seizure relay, thus to prevent application of said signalling potential to said tip, ring and sleeve wipers until location and seizure by said wipers of said idle set of tip, ring and sleeve contacts.

8. Apparatus according to claim 7 wherein said selector switch includes holding relay means operative upon seizure of said selector switch by a preceding circuit, said locking means for said memory relay includes a normally open contact of said holding relay means, and said seizure relay means includes means for releasing said holding relay means upon operation of said seizure relay means, so that operation of said seizure relay means releases said holding relay means to receive said memory relay, thus limiting to a short duration interval the application of said signalling potential to said at least one of said tip, ring and sleeve wipers.

9. Apparatus according to claim 6 wherein said selector switch includes second digit absorbing means for absorbing another selected digit, and said memory circuit includes a further memory relay operative in response to the condition of said first and second digit absorbing means, said circuit means including a normally open contact of said further memory relay, thus to provide differing signal indications on said tip, ring and sleeve wipers to differentiate between absorption of the first selecter digit, absorption of said other selected digit, and absorption of neither of said selected rights.

10. Apparatus according to claim 6 wherein said predetermined potentials are referred to ground and said signal source comprises a non-grounded battery.

11. In a telephone selector switch of the type including:

(a) incoming tip, ring and sleeve leads, (b) a plurality of tip, ring and sleeve contact sets arranged in a plurality of levels, (c) a wiper assembly mounted for vertical and rotary stepping, said wiper assembly including tip, ring and sleeve wipers adapted to be connected respectively to said incoming tip, ring and sleeve leads, said wipers cooperating with said tip, ring and sleeve contact sets, (d) an A relay operative upon seizure of said selector switch through said incoming tip and ring leads, (e) a slow release B relay operative upon operation of said A relay, (f) vertical magnet means, controlled by said A and B relays, for producing vertical stepping of said wiper assembly upon pulsing of said A relay by dial pulses received on said incoming tip and ring leads, receipt of dial pulses indicative of a digit dialed into said selector switch thus causing vertical stepping of said wiper assembly from an initial level to a predetermined level corresponding to said dialed digit, (g) a slow release C relay operative during said vertical stepping to prevent rotary stepping of said wiper assembly, said C relay releasing after completion of said vertical stepping to said predetermined level to enable rotary stepping of said wipers over the tip, ring and sleeve contact sets of said predetermined level to locate and seize an idle set of said contacts, (h) a D relay operative upon rotary stepping of said tip, ring and sleeve wipers to an idle set of tip, ring and sleeve contacts, operation of said D relay releasing said A relay and hence said B relay and connecting said incoming tip, ring and sleeve leads through to said tip, ring and sleeve wipers, (i) digit absorbing means, including a set of normal post spring contacts operative when said wiper assembly steps up to a selected level corresponding to a selected digit to be absorbed, to cause said wiper assembly to return to its initial position without rotary stepping, the improvement comprising a memory circuit for providing, at said idle tip, ring and sleeve contacts seized by said tip, ring and sleeve wipers upon dialing of a non-absorbed digit, a signal indication to indicate whether said selected digit has previously been absorbed, said memory circuit comprising (j) a memory relay, (k) circuit means, including a normally closed contact of said C relay and said normal post spring contacts, for operating said memory relay upon absorption of said selected digit, (l) locking circuit means, including a normally open tact of said B relay and a first normally open contact of said memory relay, for locking said memory relay in operated condition upon operation of said memory relay, (m) a source of signalling potential, (n) and circuit means, including a second normally open contact of said memory relay, coupling said source (m) to at least one of said tip, ring and sleeve leads, whereby, when said selected digit is absorbed, said memory relay operates and said second normally open contact thereof closes for application of said signalling potential to said at least one of said tip, ring and sleeve leads, further operation of said selector upon dialing of a further and non-absorbed digit thereinto then causing said wipers to step vertically and then to hunt to locate an idle set of tip, ring and sleeve contacts, location of said idle set of tip, ring and sleeve contacts by said wipers causing said D relay to operate to initiate release of said A relay release of said A relay effecting release of said B relay and release of said B relay releasing said memory relay to disconnect said signalling potential from said tip, ring and sleeve wipers to limit the duration of application of said signalling potential to said wipers.

12. Apparatus according to claim 11 wherein said circuit means (n) includes a normally open contact of said D relay, to prevent application of said signalling potential to said at least one of said tip, ring and sleeve wipers until after said wipers have located an idle set of tip, ring and sleeve contacts to cause operation of said D relay.

13. Apparatus according to claim 12 comprising further digit absorbing means, including at least one further set of normal post spring contacts, for absorbing a second selected digit, said sets of normal post spring contacts being operative in a first combination when said first mentioned selected digit is absorbed, a second combination when said second selected digit is absorbed, and a third combination when no digit is absorbed, a second memory relay, means coupled between said digit absorbing means and said memory relays for operating said memory relays in a first memory combination when said normal post spring contacts are operative in their first combination, a second memory combination when said normal post spring contacts are operative in their second combination, and a third memory combination when said normal post spring contacts are operated in their third combination, means for preventing operation of said memory relays in said third memory combination if said memory relays are already operated in said first or second memory combinations, and further circuit means, including a normally open contact of said second memory relay and said normally open contact of said D relay, connecting said signalling potential to a selected at least one of said tip, ring and sleeve leads, whereby, when a non-absorbed digit is dialed into said selector switch, said signalling potential is applied to said tip, ring and sleeve leads in one of a plurality of combinations to indicate whether said first mentioned selected digit or said second selected digit has previously been absorbed.

14. Apparatus according to claim 11 wherein said source of signalling potential is a non-grounded source.

15. In a telephone system, (a) a telephone selector switch operating and signalling with predetermined potentials and including:
(1) a plurality of outgoing tip, ring and sleeve contact sets arranged in a plurality of levels,
(2) tip, ring and sleeve wipers cooperating with said contact sets,
(3) digit absorbing means for absorbing a first selected digit,
(4) receipt by said selector switch of dial pulses indicating dialing of a second and non-absorbed digit causing said wipers to step to a level controlled by the number of said dial pulses, said wipers then testing the tip, ring and sleeve contact sets on said level to locate an idle one of said sets,
(5) seizure means operative upon location by said wipers of an idle one of said sets to terminate said testing, such idle set thus being seized by said wipers, operation of said seizure means placing a seizure signal upon the sleeve contact of said seized set, (b) a memory circuit for providing, on the tip, ring and sleeve contact set seized by said wipers upon dialing of said second digit, a signal indicative of whether said first selected digit has previously been absorbed, said memory circuit comprising
(1) memory means having a first operating condition and a second operating condition, said memory means being coupled to said digit absorbing means and being responsive to operation thereof to assume said first operating condition when said selected digit is absorbed and said second operating condition when said selected digit is not absorbed,
(2) source means for supplying a signalling potential different from said predetermined potentials,
(3) and switching means responsive to the condition of said memory means for selectively coupling said source means to at least one of said tip, ring and sleeve wipers when said memory means is in one of its operating conditions and for isolating said source means from said one of said tip, ring and sleeve wipers when said memory means is in the other of its operating conditions, said switching means thus providing a first memory signalling condition of said seized tip, ring and sleeve contact set when said memory means is in its first operating condition and a second and different memory signalling condition of said seized tip, ring and sleeve contact set when said memory means is in its second operating condition, (c) a trunk splitting circuit comprising:
(1) input tip, ring and sleeve leads connected respectively to said seized tip, ring and sleeve contact set to assume the signalling condition of the latter,
(2) a first set of output tip, ring and sleeve leads, and a second set of output tip, ring and sleeve leads,
(3) and second switching means coupled to said incoming tip, ring and sleeve leads and responsive to the signalling condition of the latter to connect said incoming tip, ring and sleeve leads to said first set of output leads when said incoming tip, ring and sleeve leads are in said first signalling condition and to connect said incoming tip, ring and sleeve leads to said second set of output leads when said incoming tip, ring and sleeve leads are in said second signalling condition, 16. A system according to claim 15 where said second switching means includes first relay means coupled to said incoming leads and having a first operating condition when said incoming leads are in said first signalling condition and a second operating condition when said incoming leads are in said second signalling condition, said first relay means including contacts for switching said incoming tip, ring and sleeve leads to said first set of output leads when said first relay means is in its first operating condition and to said second set of output leads when said first relay means is in its second operating condition.

17. A system according to claim 15 wherein:

(d) said source means is a non-grounded source having a first potential side and a second potential side, said first switching means being coupled to said first potential side of said source, (e) and said second switching means includes: first relay means coupled to said second potential side of said source, said first relay means having an operate path coupled through at least one of said incoming tip, ring and sleeve leads to said at least one of said tip, ring and sleeve wipers, said first relay means assuming a first operating condition when said incoming leads are in said first signalling condition and a second operating condition when said incoming leads are in said second signalling condition, second relay means operative in response to receipt of said seizure signal over said incoming sleeve lead to disconnect the operate path of said first relay means and to provide an alternative locking path to said predetermined potentials for said first relay means, said first relay means including contacts for switching said incoming leads to said first set of output leads when said first relay means is in its first operating condition and to said second set of output leads when said first relay means is in its second operating condition.

18. A system according to claim 17 wherein said trunk splitting circuit includes:

(f) a first busy relay, and means connecting said first busy relay to said first output sleeve lead to operate said first busy relay and lock the same operated when a signal is received on said first output sleeve lead indicating that said first set of output leads are busy, (g) a second busy relay, and means connecting said second busy relay to said second output sleeve lead to operate said second busy relay and lock the same operated when a signal is received on said second output sleeve lead indicating that said second set of output leads are busy, (h) an all trunks busy relay, and means coupling said all trunks busy relay to said incoming tip, ring and sleeve leads for operation of said all trunks busy relay to disconnect said incoming tip, ring and sleeve leads from both sets of said output leads and to effect application of all trunks busy tone to said incoming tip and ring leads, (i) means for operating said all trunks busy relay when said first relay means is in its first operating condition and said first busy relay is operated, (j) and alternative means for operating said all trunks busy relay when said first relay means is in its second operating condition, and said second busy relay is operated, whereby all trunks busy signal will be placed on said incoming tip and ring leads when said incoming tip and ring leads are to be switched to a selected set of said first and second output leads and said selected set is busy, and no all trunks busy tone will be placed on said incoming tip and ring leads when they are to be switched to said selected set of output leads and only the other set of output leads is busy.

19. A system according to claim 18 wherein said means (i) and (j) each include a normally open contact of said second relay means, to prevent operation of said all trunks busy relay until said second relay means has operated.

20. A trunk splitting circuit comprising:

(a) incoming tip, ring and sleeve leads adapted to carry a first selection signal and a second selection signal, (b) a first output having a first set of output tip, ring and sleeve leads, and a second output having a second set of output tip, ring and sleeve leads.

(c) first relay means coupled to said incoming leads and responsive to said selection signals to assume a first operating condition when said incoming leads are carrying said first selection signal and a second operating condition when said incoming leads are carrying said second selection signal, said first relay means including contacts for switching said input leads to said first set of output leads when said first relay means is in its first operating condition and to said second set of output leads when said first relay means is in its second operating condition, (d) a first busy relay, and means connecting said first busy relay to said first output sleeve lead to operate said first busy relay and lock the same operated when a signal is received on said first output sleeve lead indicating that said first output is busy, (e) a second busy relay, and means connecting said second busy relay to said second output sleeve lead to operate said second busy relay and lock the same operated when a signal is received on said second output sleeve lead indicating that said second output is busy, (f) an all trunks busy relay, and means coupling said all trunks busy relay to said incoming tip, ring and sleeve leads for operation of said all trunks busy relay to disconnect said incoming tip, ring and sleeve leads from both sets of said output leads and to effect application of all trunks busy tone to said incoming tip and ring leads, (g) means for operating said all trunks busy relay when said first relay means is in its first operating condition and said first busy relay is operated, (h) and alternative means for operating said all trunks busy relay when said first relay means is in its second operating condition, and said second busy relay is operated, whereby all trunks busy signal will be placed on said incoming tip and ring leads when said incoming leads are carrying said first selection signal and said first selection signal and said first output is busy, or when said incoming leads are carrying said second selection signal and said second output is busy, but not when said incoming leads are carrying said first selection signal and only said second output is busy nor when said incoming leads are carrying said second selection signal and only said first output is busy.

References Cited

UNITED STATES PATENTS

| | | |
|---|---|---|
| 2,513,400 | 7/1950 | Carson et al. |
| 2,642,498 | 6/1953 | Riddell et al. |
| 3,316,356 | 4/1967 | Wannan. |

WILLIAM C. COOPER, Primary Examiner